United States Patent
Byrne

(10) Patent No.: US 6,223,288 B1
(45) Date of Patent: *Apr. 24, 2001

(54) SYSTEM FOR PERSISTENTLY ENCRYPTING CRITICAL SOFTWARE FILE TO PREVENT INSTALLATION OF SOFTWARE PROGRAM ON UNAUTHORIZED COMPUTERS

(75) Inventor: Shannon Byrne, Whistler (CA)

(73) Assignee: Protexis Inc. (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/083,176

(22) Filed: May 22, 1998

(51) Int. Cl.[7] ....................................................... G06F 1/24
(52) U.S. Cl. .......................... 713/190; 713/150; 713/165; 380/255; 380/278; 380/279
(58) Field of Search .................... 380/255, 278, 380/279, 283; 713/150, 165, 168, 171, 190

(56) References Cited

U.S. PATENT DOCUMENTS

| | | | |
|---|---|---|---|
| 4,713,753 | 12/1987 | Boebert et al. | 364/200 |
| 4,736,423 | 4/1988 | Matyas | 380/23 |
| 4,888,798 | 12/1989 | Earnest | 380/4 |
| 4,897,874 | 1/1990 | Lidinsky et al. | 380/25 |
| 4,926,476 | 5/1990 | Covey | 380/4 |
| 5,010,571 | 4/1991 | Katznelson | 380/4 |
| 5,058,162 | 10/1991 | Santon | 380/25 |
| 5,218,638 | 6/1993 | Matsumoto et al. | 380/23 |
| 5,247,575 | 9/1993 | Sprague | 380/9 |
| 5,297,206 | 3/1994 | Orton | 380/30 |
| 5,319,705 | 6/1994 | Halter et al. | 380/4 |
| 5,337,357 | 8/1994 | Chou et al. | 380/4 |
| 5,369,702 | 11/1994 | Shanton | 380/4 |
| 5,386,369 | 1/1995 | Christiano | 364/464 |
| 5,400,403 | 3/1995 | Fahn et al. | 380/21 |
| 5,410,598 | 4/1995 | Shear | 380/4 |
| 5,414,772 | 5/1995 | Naccache et al. | 380/46 |
| 5,454,101 | 9/1995 | Mackay et al. | 395/600 |
| 5,457,746 | 10/1995 | Dolphin | 380/4 |
| 5,499,295 | 3/1996 | Cooper | 380/23 |
| 5,504,814 | 4/1996 | Miyahara | 380/4 |
| 5,509,070 | 4/1996 | Schull | 380/4 |
| 5,511,122 | 4/1996 | Atkinson | 380/25 |
| 5,557,796 | 9/1996 | Fehskens et al. | 395/650 |
| 5,615,264 | 3/1997 | Kazmierczak et al. | 380/4 |
| 5,634,012 | 5/1997 | Stefik et al. | 395/239 |
| 5,646,992 | 7/1997 | Sabler | 380/4 |
| 5,898,777 | 4/1999 | Tycksen, Jr. et al. | 380/4 |
| 5,982,887 | * 11/1999 | Hirotani | 380/4 |
| 5,991,402 | * 11/1999 | Jia et al. | 380/9 |
| 5,999,622 | * 12/1999 | Yasukawa et al. | 380/4 |

FOREIGN PATENT DOCUMENTS

WO020508  10/1993  (WO).
WO021162   6/1997  (WO).

* cited by examiner

Primary Examiner—Thomas R. Peeso
(74) Attorney, Agent, or Firm—Roylance, Abrams, Berdo & Goodman

(57) ABSTRACT

A data encryption/decryption system is provided which encrypts a critical file to a software program using an embedded executable. The executable programs a user computer to prompt a user to purchase a license key to decrypt the critical file in order to run the software program.

7 Claims, 4 Drawing Sheets

SYSTEM FOR PERSISTENTLY ENCRYPTING CRITICAL SOFTWARE FILE TO PREVENT INSTALLATION OF SOFTWARE PROGRAM ON UNAUTHORIZED COMPUTERS

CROSS REFERENCE TO RELATED APPLICATIONS

Related subject matter is disclosed and claimed in application Ser. No. 09/031,536, filed Feb. 27, 1998, and in application Ser. No. 08/670,846, filed Jun. 28, 1996, now U.S. Pat. No. 5,809,145. The entire subject of both applications is hereby incorporated herein by reference for all purposes.

FIELD OF INVENTION

The invention relates to a system for encrypting a selected program file, the decryption of which is critical to the successful installation or execution of a software program. The encryption method involves wrapping the selected program file to permit limited unlocking thereof without complete decryption or unwrapping.

BACKGROUND OF THE INVENTION

Demand for network-based distribution of protected and unprotected data is increasing dramatically. Yet, many challenges exist that need to be addressed to effectively distribute data via electronic commerce such as: (1) conducting reliable, secure transactions necessary to build confidence with both information providers (e.g., data publishers) and data customers; and (2) ensuring that information providers or publishers can specify access controls to prevent piracy (e.g., installation of a software program on more than the allowable number of machines specified by a software program vendor), among other challenges.

A need exists for a data distribution infrastructure which addresses the aforementioned challenges and which overcomes a number of disadvantages associated with existing distributed data commerce systems. Existing methods for preparing software programs for retail sales provide several software programs on a compact disc (CD), for example, since a CD has substantial memory capacity. The unit price of each CD, however, can be excessive, particularly if the consumer only wishes to have access to one of the programs stored thereon. Accordingly, software vendors have been encrypting all but one of the software programs available on a CD and selling the CD for the price of the one program that is not encrypted. If the consumer wishes to access the other encrypted programs on the CD, the consumer can contact the software vendor at a later time to purchase the release codes to decrypt remaining software programs on the CD. The software retailer, however, does not profit from the purchases of release codes after the initial sale of the CD. Thus, problems are presented in the software retail chain. Software retailers are less likely to use retail space to display software programs for which they do not receive compensation from vendors for subsequent release code purchases. Consumers are therefore not presented with all of the available software by retailers, and software vendors are provided with a less effective retail chain.

Another problem facing software vendors is piracy of software programs. Piracy can be in a number of forms such as unlocking encrypted software for illegal copying and retail sale, as well as the installation of unlocked software onto more computers than permitted under the software license. A need exists for an encryption/decryption system for software programs which restricts the use of unlocked software to the purposes intended by the software vendor.

SUMMARY OF THE INVENTION

In accordance with an aspect of the present invention, an encryption/decryption system is provided wherein a software program to be distributed comprises at least one critical program file that is persistently encrypted. The critical program file is selected to be a file without which the software program cannot be successfully installed or executed. The critical program file is encrypted to permit the software program to be installed according to the related software license.

In accordance with another aspect of the present invention, an encryption method uses an encryption wrapper with the critical file and permits only restricted unlocking of the critical file. The critical file is not completely unwrapped or visible to the computer user.

In accordance with yet another aspect of the present invention, individual programs within a suite of programs provided by the same software distribution means (e.g., a CD, an internet transaction or a satellite signal transmission) can be individually encrypted using a wrapper on respective critical files in each of the individual programs.

BRIEF DESCRIPTION OF THE DRAWINGS

These and other features and advantages of the present invention will be more readily comprehended from the following detailed description when read in connection with the appended drawings, which form a part of this original disclosure, and wherein.

DETAILED DESCRIPTION OF THE PREFERRED EMBODIMENTS

Figure 1:
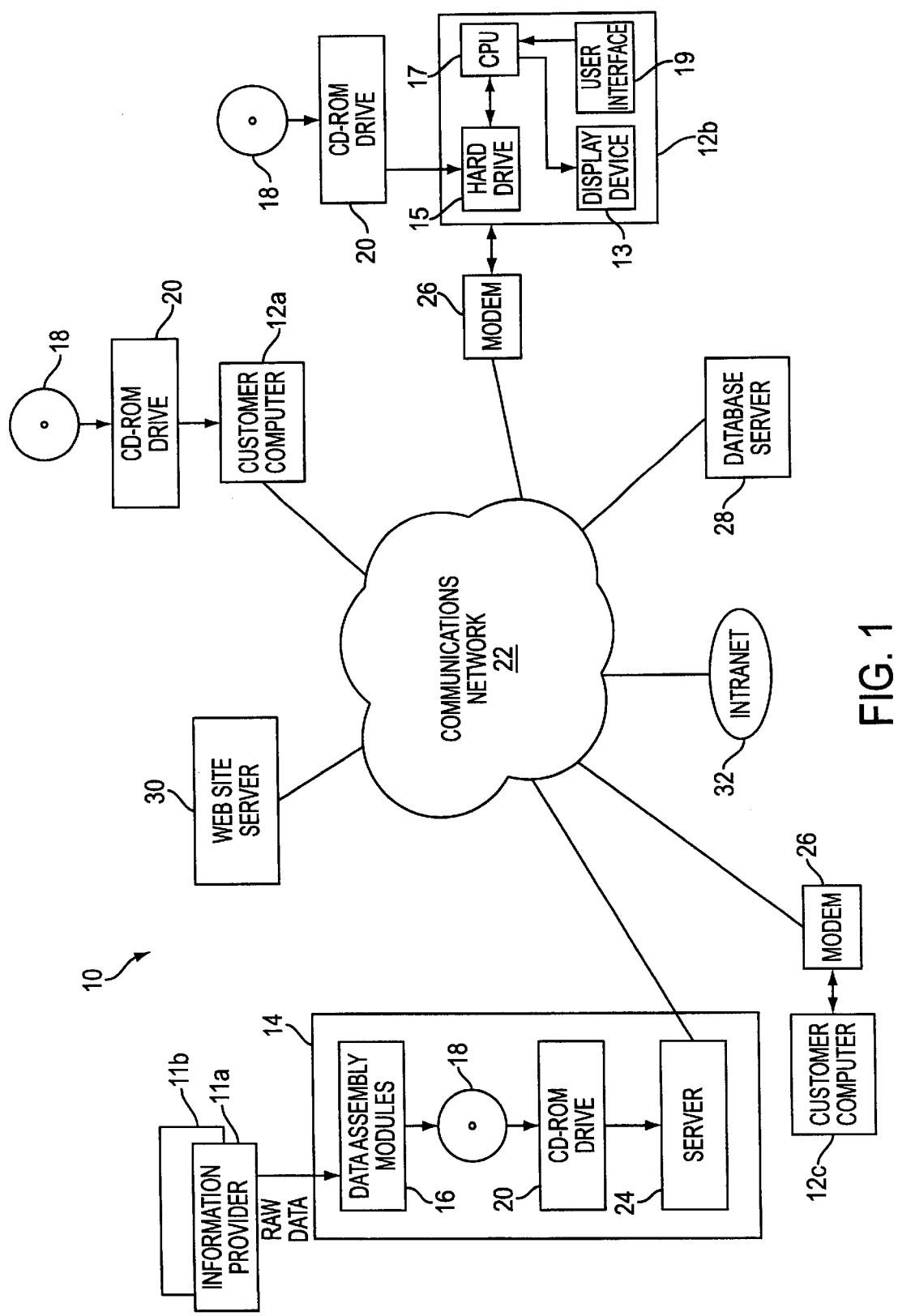
FIG. 1 is a schematic block diagram of a data distribution system (DDS) constructed in accordance with an embodiment of the present invention.

With reference to FIG. 1, a data distribution system (DDS) 10 is provided in accordance with the present invention to allow information providers (IPs) to prepare digital information for commerce, as well as to perform data retrieval and transmission, and transactional services. The DDS 10 allows customers or end-users to browse or search for data available from a number of IPs and to purchase selected data directly via their respective computers. As shown in FIG. 1, data can be distributed by a number of methods such as by storing data (e.g., software programs) on CDs or other data storage devices (e.g., digital audio tapes or magnetic diskettes) for shipping to retail locations or directly from the software vendor to the consumer. Data can also be distributed to consumer computers electronically via the internet or other communication links such as by satellite communication. FIG. 1 depicts different data distribution paths for illustrative purposes. It is to be understood that other data distribution paths can be used within the scope of the present invention.

FIG. 1 depicts three exemplary consumer computers 12a, 12b and 12c which are collectively referred to as consumer computers 12. The consumer computers 12 are preferably conventional personal computers which comprise a monitor or display device 13, an optional hard drive 15, a central processing unit 17 and an input device 19 such as a keyboard or a mouse. The computers can operate using one of a number of operating systems developed for IBM-compatible or Macintosh computers or the UNIX operating system, for example.

IPs can be software publishers which provide raw data such as program code to a fulfillment center 14. The fulfillment center 14 can arrange raw data into datasets for viewing and purchasing via the aforementioned methods, that is, via physically-distributed storage devices or electronically via communication networks 22 (e.g., the internet). The fulfillment center 14 can be configured to encrypt and store data such as program code on a master copy of a portable data storage device such as a compact disc read-only memory (CD-ROM). The master CD-ROM can then be mass-produced and distributed to consumers. Datasets from more than one IP 11 can be stored on a single CD-ROM 18. Alternatively, encrypted datasets can be stored at a CD-ROM drive 20 at the fulfillment center for example, or at an IP website server 30, a database server 28, an intranet 32, among other electronic transaction mechanisms. Thus, a customer computer that is not connected to a CD-ROM drive 20 can have on-line access to datasets at the fulfillment center 14 via a modem 26 or other network interface device. The network 22 can be a public switched telephone network, an optical fiber network, a satellite communication network, a microwave or cellular communication network, among other types of networks, or a combination of different types of communication networks.

Figure 2:
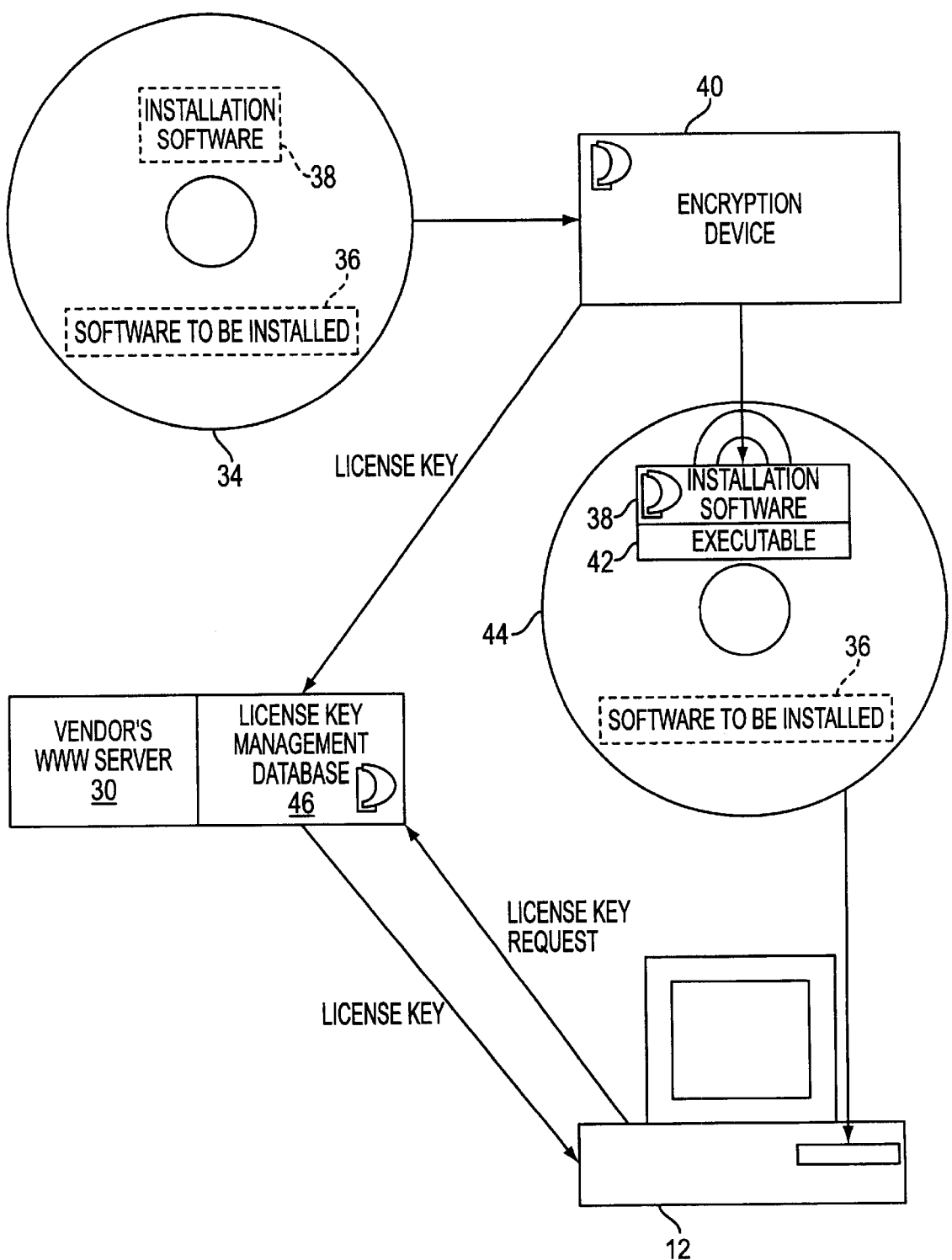
FIG. 2 is a schematic block diagram illustrating data encryption/decryption system (DES) components constructed in accordance with an embodiment of the present invention for requesting and receiving a license key to unlock encrypted data.

In accordance with an embodiment of the present invention, software vendors' products are encrypted in a manner which requires a consumer to obtain a license key in order to successfully install or execute the software. With reference to FIG. 2, a software vendor's unprotected software program 34 is depicted for illustrative purposes. The software program 34 comprises at least one application program file indicated at 36, as well as an installation program file indicated at 38 to install the application program 36 on a consumer computer 12. The installation software is selected to be encrypted by way of an example. As will be described below, other files which are critical to the successful installation or operation of the software can be selected for encryption.

With continued reference to FIG. 2, the installation software is provided to an encryption device 40. The encryption device 40 is preferably the Desktop Encryption/Decryption System (DES) described in application Ser. No. 09/031,536, filed Feb. 27, 1998. The DES 40 provides the selected program file (e.g., the installation program file) with an embedded executable 42 to provide preview and purchase functions, which are described below, to the customer without having to modify software applications and the operating system (OS) on the computer 12 prior to receiving the license key or other secured content. Once the critical file is encrypted, the encrypted file 38 is stored on a CD-ROM 44, for example, along with the remaining unprotected program files.

Figure 3:
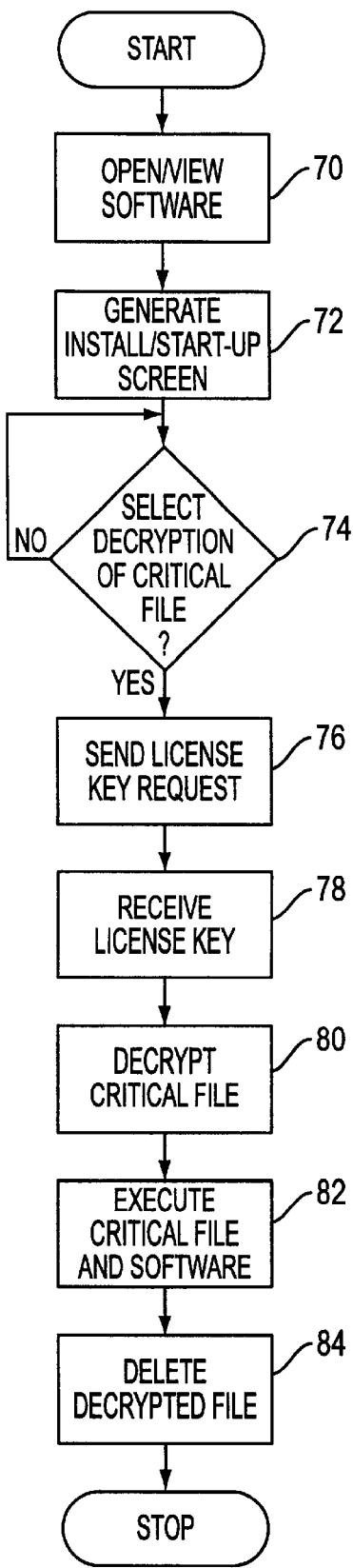
FIG. 3 is a flow chart depicting the sequence of operations for requesting and receiving a license key to unlock encrypted data in accordance with an embodiment of the present invention.
Figure 4:
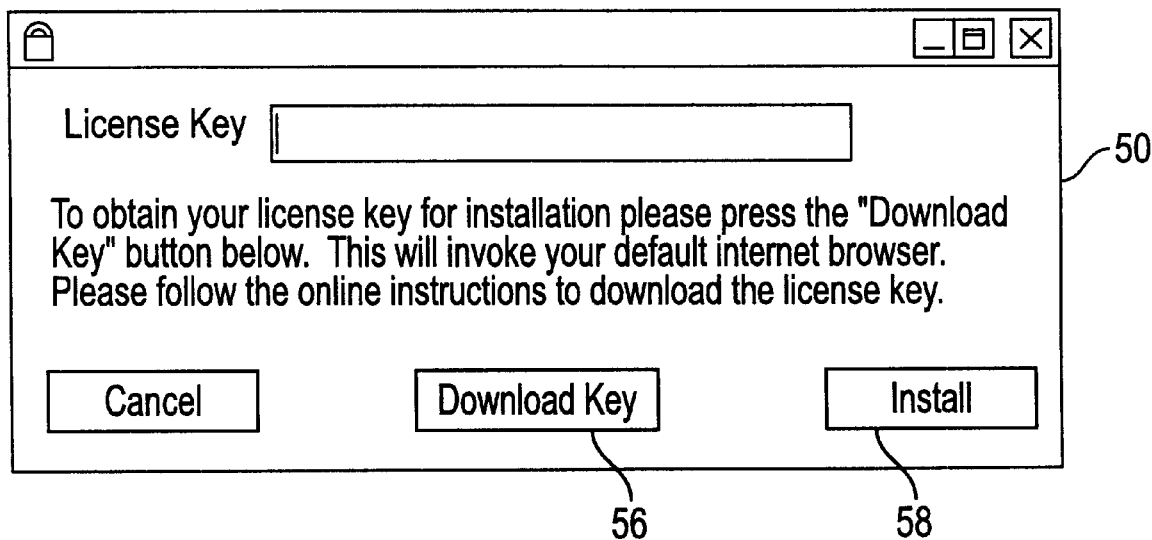
FIG. 4 depicts an exemplary computer screen generated on a consumer's computer to request a license key to decrypt a critical file.

The process of using a protected software program in accordance with the present invention is described with reference to FIG. 3. When the CD-ROM 44 is purchased, the consumer loads the CD-ROM onto a computer 12 in a conventional manner (block 70). It is to be understood that the protected software program can also be downloaded electronically from a remote source. The installation program 38 generates a screen 50 (block 72), as shown in FIG. 4, which provides a "welcome " dialog instructing the user that a license key is required to install the program, and a button 56 labeled "Download key". When the button 56 is selected (block 74), the embedded executable associated with the installation program 38 programs the computer 12 to send a license key request to the vendor website 30 or other transaction location via a communication network 22 (block 76). The website 30 or another transaction computer or a human operator at a fulfillment center 14 transmits a license key to the computer 12. Once the license key is received at the consumer computer 12 (block 78), the installation program 38 is decrypted (block 80). The installation program is then invoked by selecting the button 58 in screen 50 which is labeled "Install" (block 82). The transaction for the license key can be conducted via telephone, facsimile or internet transmission. The encrypted installation file 38 is not available to the consumer in a raw data format, but rather is stored as a hidden, persistently encrypted file. Thus, the installation program 38 can only be unlocked and used for its intended purpose, that is, to install the software program on the consumer computer 12. When installation is complete, the decrypted installation program file 38 is deleted (block 84). Thus, the installation program 38 does not remain decrypted or unwrapped to permit installation of the software program 36 on other computers.

The encryption is preferably in accordance with the encryption method described in the above-referenced application Ser. No. 08/670,846, filed Jun. 28, 1996, which generates machine-dependent release codes. Other encryption algorithms, however, can be used. The special handlers of the DES 40 assign a product code for the protected file 38 and create a code or key to decrypt or unlock the protected file. With reference to FIG. 3, the IP 12 can store the license keys in a license key management database 46.

The file selected for encryption can be another type of file than an installation file or set-up executable. For example, the file can be a communication file or any other critical file that is necessary for the proper functioning of the software program for which protection is desired.

Software files which have been encrypted and decrypted in accordance with the present invention are advantageous over software protected in a conventional manner. Software that is protected in its entirety in a conventional manner can be unwrapped completely and then subjected to unauthorized use. By wrapping only a critical file in accordance with the present invention, the decryption process is simplified. Further, the decrypted file can be used in only a restricted manner that is specified by the software vendor for the encryption process. Since the encrypted file is hidden and is unwrapped only temporarily before being deleted, the decrypted file cannot be completely unwrapped to permit unauthorized uses of the protected software. In addition, the encryption/decryption system of the present invention facilitates the encryption of a critical file in each of several protected software programs distributed together. Thus, a user must purchase the license code for each program on a CD-ROM containing several programs, for example, in order to decrypt the corresponding program. This individual encryption and decryption process permits improved monitoring of licenses which is useful in negotiating agreements to compensate software retailers.

While certain advantageous embodiments have been chosen to illustrate the invention, it will be understood by those skilled in the art that various changes and modifications can be made therein without departing from the scope of the invention as defined in the appended claims.

What is claimed is:

1. A method of protecting a software program from piracy, the software program comprising a plurality of program files, the method comprising the steps of:

selecting at least one of said plurality of program files that is required for said software program to successful run on a computer, said computer being connected to memory device, a display device and a user input device;

encrypting said selected file with an embedded executable that is hidden from a user of said computer;

providing said software program comprising said selected file to said computer, said software program being incapable of being executed until said selected file is encrypted;

invoking said embedded executable to obtain a key code to decrypt said selected file and run said software program, said invoking step comprising the step of generating at least one user prompt on said display device using said embedded executable to query said user as to whether running said software progam is desired;

receiving an input signal from said user input device indicating that said user desires decryption of said embedded executable to run said software program;

generating a key request using said computer via said embedded executable;

providing said key request to a remote computer in accordance with said embedded executable; and transmitting a key to said computer in response to said key request, said key being operable to decrypt said selected file.

2. A method as claimed in claim 1, further comprising the step of performing a payment transaction with said remote computer to purchase said key in accordance with said embedded executable.

3. A system for protecting a software program from piracy comprising:

a consumer computer on which said software program is desired to be run;

an encryption device configured to encrypt a critical file required to successfully run said software program on said consumer computer using an embedded executable and to generate a key to decrypt said critical file;

a server and key database configured to store said key;

a communication link for connecting said consumer computer and said server and key database, said embedded executable being programmed to generate a key request for processing by said server and key database and to receive said key therefrom via said communication link, said consumer computer being operable in accordance with said executable file to decrypt said critical file using said key and to run said software program, said embedded executable being programmed to delete said decrypted critical file after said software program has begun to run.

4. A system as claimed in claim 3, wherein said communication link is at least one of a voice conversation, a facsimile transmission, and an electronic message on at least one of a wireline and a wireless link.

5. A method of protecting a software program from piracy, the software program comprising a ply of program files, the method comprising the steps of:

selecting at least one of said plurality of program files that is required for said software program to successfully run on a computer, said computer being connected to memory device, a display device and a user input device;

encrypting said selected file with an embedded executable that is hidden from a user of said computer;

providing said software program comprising said selected file to said computer, said software program being incapable of being executed until said selected file is encrypted; and invoking said embedded executable to obtain a key code to decrypt said selected file and run said software program;

wherein said invoking step further comprises the steps of generating a key request using said computer via said embedded executable;

providing said key request to a remote computer in accordance with said embedded executable; and transmitting a key to said computer in response to said key request, said key being operable to decrypt said selected file.

6. A method of protecting a software program from piracy, the software program comprising a plurality of program files, the method comprising the steps of:

selecting at least one of said plurality of program files that is required for said software program to successfully run on a computer, said computer being connected to memory device, a display device and a user input device;

encrypting said selected file with an embedded executable that is hidden from a user of said computer;

providing said software program comprising said selected file to said computer, said software program being incapable of being executed until said selected file is encrypted; invoking said embedded executable to obtain a key code to decrypt said selected file and run said software progam; and deleting said decrypted embedded executable file from said memory device after said software program is initialized.

7. A method as claimed in claim 6, wherein said selected file is a set-up executable file to install said software program and said deleting step comprises the step of deleting said set-up executable after said set-up executable has been decrypted using said key and used to install said software program.

* * * * *